US010005157B2

(12) United States Patent
Kim et al.

(10) Patent No.: US 10,005,157 B2
(45) Date of Patent: Jun. 26, 2018

(54) CATHODE CUTTING DEVICE USING LASER

(71) Applicant: LG CHEM, LTD., Seoul (KR)

(72) Inventors: Tae Su Kim, Daejeon (KR); Ki Eun Sung, Daejeon (KR); Sang Ik Lee, Daejeon (KR); Jin Soo Lee, Daejeon (KR); Jin Ho Ban, Daejeon (KR); Dae Han Seo, Daejeon (KR); Bu Gon Shin, Daejeon (KR); Ki Hong Min, Daejeon (KR); Young Min Yuk, Daejeon (KR); Chang Bum Ahn, Daejeon (KR)

(73) Assignee: LG Chem, Ltd., Seoul (KR)

( * ) Notice: Subject to any disclaimer, the term of this patent is extended or adjusted under 35 U.S.C. 154(b) by 58 days.

(21) Appl. No.: 14/429,294

(22) PCT Filed: Oct. 31, 2014

(86) PCT No.: PCT/KR2014/010370
§ 371 (c)(1),
(2) Date: Mar. 18, 2015

(87) PCT Pub. No.: WO2015/065105
PCT Pub. Date: May 7, 2015

(65) Prior Publication Data
US 2016/0263705 A1  Sep. 15, 2016

(30) Foreign Application Priority Data
Nov. 1, 2013  (KR) .................. 10-2013-0132063

(51) Int. Cl.
B23K 26/38  (2014.01)
B23K 26/082  (2014.01)
(Continued)

(52) U.S. Cl.
CPC ............ *B23K 26/38* (2013.01); *B23K 26/042* (2015.10); *B23K 26/0622* (2015.10);
(Continued)

(58) Field of Classification Search
CPC .. B23K 26/38; B23K 26/042; B23K 26/0622; B23K 26/0648; B23K 26/073; B23K 26/082
(Continued)

(56) References Cited

U.S. PATENT DOCUMENTS 4,107,528 A * 8/1978 Silverman ................. B44B 7/00
                                                     250/317.1
5,450,434 A    9/1995 Ota et al.
(Continued)

FOREIGN PATENT DOCUMENTS

EP    0571914 A1    12/1993
JP    63-258342 A   10/1988
(Continued)

OTHER PUBLICATIONS

Extended European Search Report dated Nov. 13, 2015 in European Patent Application No. 14843174.5 (7 pages).

*Primary Examiner* — Samuel M Heinrich
(74) *Attorney, Agent, or Firm* — Dentons US LLP

(57) ABSTRACT

The present invention relates to a lithium secondary battery, and more specifically to a lithium secondary battery having a multi-directional lead-tab structure. The lithium secondary battery of the present invention includes: an electrode assembly which is formed by alternately laminating an electrode plate having a current collector, an active material, and a tab, and an isolation layer; a lead which is electrically connected to the tab; and a battery case, wherein the lead is divided into an anode lead and a cathode lead, and at least two or more anode leads and cathode leads are provided. The (Continued)

battery of the present invention uses the same lead-tab size as the prior art and is suitable for use with high current.

10 Claims, 9 Drawing Sheets

(51) Int. Cl.
    *B23K 26/06*         (2014.01)
    *B23K 26/073*      (2006.01)
    *B23K 26/042*      (2014.01)
    *B23K 26/0622*     (2014.01)
    *B23K 26/08*         (2014.01)
    *B23K 101/16*      (2006.01)
    *B23K 101/38*      (2006.01)

(52) U.S. Cl.
    CPC ...... *B23K 26/0648* (2013.01); *B23K 26/0665* (2013.01); *B23K 26/073* (2013.01); *B23K 26/082* (2015.10); *B23K 26/0846* (2013.01); *B23K 2201/16* (2013.01); *B23K 2201/38* (2013.01)

(58) Field of Classification Search
    USPC ........................................ 219/121.67–121.72
    See application file for complete search history.

(56) References Cited

U.S. PATENT DOCUMENTS

| | | | |
|---|---|---|---|
| 8,834,666 B2 * | 9/2014 | Sreetharan | H01L 41/25 156/290 |
| 2004/0108305 A1 | 6/2004 | Harnisch et al. | |
| 2004/0121493 A1 | 6/2004 | Han et al. | |
| 2004/0221947 A1 | 11/2004 | Haldner et al. | |
| 2004/0256368 A1 | 12/2004 | Han et al. | |
| 2009/0081512 A1 * | 3/2009 | Blanchard | H01M 8/122 429/425 |
| 2010/0197116 A1 | 8/2010 | Shah et al. | |
| 2012/0196454 A1 | 8/2012 | Shah et al. | |
| 2014/0312469 A1 | 10/2014 | Shah et al. | |

FOREIGN PATENT DOCUMENTS

| | | |
|---|---|---|
| JP | 2002-35982 A | 2/2002 |
| JP | 2003-104592 A | 4/2003 |
| JP | 2004-106421 A | 4/2004 |
| JP | 2004-202575 A | 7/2004 |
| JP | 2004-223987 A | 8/2004 |
| JP | 2005-066687 A | 3/2005 |
| JP | 2007-14993 A | 1/2007 |
| JP | 2007-067431 A | 3/2007 |
| JP | 2007-203305 A | 8/2007 |
| JP | 2009-122973 A | 6/2009 |
| JP | 2009-285693 A | 12/2009 |
| JP | 2011-517622 A | 6/2011 |
| KR | 100790644 B1 | 1/2008 |
| KR | 10-2008-0101725 A | 11/2008 |
| KR | 1020130017651 A | 2/2013 |
| WO | 2004075174 A2 | 9/2004 |
| WO | 2010136081 A1 | 12/2010 |

\* cited by examiner

CATHODE CUTTING DEVICE USING LASER

CROSS-REFERENCE TO RELATED APPLICATIONS

This application is a National Stage Application of International Application No. PCT/KR2014/010370, filed Oct. 31, 2014, and claims the benefit of Korean Patent Application No. 10-2013-0132063 filed on Nov. 1, 2013, all of which are hereby incorporated by reference in their entirety for all purposes as if fully set forth herein.

TECHNICAL FIELD

The present invention relates to a cathode cutting device using a laser and more particularly, to a cathode cutting device that may continuously cut a cathode sheet by using a laser.

BACKGROUND ART

In general, a demand for a secondary battery is increasing due to the technological development of a mobile device and an increase in demand therefor, and among others, a lithium (ion/polymer) secondary battery having a high energy density and operating voltage and excellent preservation and life characteristics is being widely used as an energy source for various electronic products including various mobile devices.

The lithium (ion/polymer) secondary battery has a structure in which an electrode assembly having a structure in which a cathode and an anode are alternately stacked and a separator is disposed inbetween is stored in an external casing.

An electrode forming the electrode assembly has a structure in which an electrode tab is exposed to one end of a flat electrode plate, and a mold cutter has been typically used in order to manufacture the electrode plate to which the electrode tab is exposed. In particular, the electrode plate to which the electrode tab is exposed is manufactured by using the mold cutter having a shape capable of remaining the shape of the electrode tab on an electrode plate material and cutting out other portions.

As such, when an electrode material is cut by using the mold cutter, there is an advantage in that cutting quality is high but there are limitations in that it takes a lot of time to manufacture a mold cutter having a precise shape and the mold cutter itself is expensive, and there is another limitation in that it has no choice but to cut the electrode material according to the shape of the mold cutter only. Thus, in order to manufacture an electrode plate having various shapes and sizes on a factory line cutting the electrode material, processes of stopping a production line, replacing the mold cutter and then re-operating the production line should be repeated many times.

Providing and replacing various kinds of mold cutters do not only increase the production cost of the mold cutter but also remarkably decrease the yield of the electrode plate that may be produced for a unit time.

SUMMARY OF THE INVENTION

In order to solve the foregoing limitations, the present invention addresses a cathode among electrodes and provides a cathode cutting device having high yield and operation rate because there is no need to stop a manufacturing line even if cathodes having various shapes are manufactured on a manufacturing line.

The present invention also provides a cathode cutting device that may lower the cost of a cathode cutting process.

According to an aspect of the present invention, there is provided a According to an aspect of the present invention, there is provided a cathode cutting device using a laser including: a laser oscillator emitting a laser beam; and a focusing lens focusing the laser beam emitted from the laser oscillator and radiating a focused laser beam to a cathode sheet to cut the cathode sheet, wherein the a size of a focal spot of the laser beam radiated to a surface of the cathode sheet is about 10 μm to about 50 μm, and energy density of the focal spot is equal to or higher than about 25 J/cm2.

A frequency of the laser beam may be about 35 kHz to about 300 kHz.

Power of the laser beam may be about 20 W to about 500 W.

The laser may have a beam mode parameter $M^2$ of 1 to 2.0, the beam mode parameter being a variable representing quality of the laser.

A focal length of the focusing lens may be about 100 mm to about 300 mm.

The cathode cutting device may further include: an un-winder unwinding the cathode sheet; and a winder disposed at an interval from the un-winder and re-winding the cathode sheet being unwound from the un-winder, wherein the focusing lens may radiate the laser beam to a suspension section of the cathode sheet between the un-winder and the winder.

The cathode cutting device may further include a sheet guide supporting at least a portion of the suspension section to inhibit, a region of the suspension section of the cathode sheet to which a focused laser is radiated, from sagging.

The sheet guide may include a first guide supporting a first surface being a sagging surface of both surfaces of the suspension section of the cathode sheet, and a second guide disposed over a second surface at an interval from the second surface of the suspension section to inhibit the suspension section of the cathode sheet from rolling in the opposite direction to the sagging surface of both surfaces of the suspension section of the cathode sheet.

A gap between the first guide and the second guide may be about 0.5 mm to about 2 mm.

The cathode cutting device may further include first and second mirrors disposed on an optical path connecting to the laser oscillator and the focusing lens, wherein the first and second mirrors may be rotatable about first and second axes forming an orthogonal coordinate system to allow a focal spot of a laser beam focused by the focusing lens to move to a desired location on a surface of the cathode sheet.

The cathode cutting device may further include a light width adjuster disposed on the optical path, wherein the light width adjuster may be located closer than the first and second mirrors to the laser oscillator to adjust a light width of the laser beam emitted from the laser oscillator.

The light width adjuster may include a first lens and a second lens located farther than the first lens from the laser oscillator, and the light width adjuster may have a distance adjustment structure between the first lens and the second lens to adjust a mutual distance between a focal spot of a laser beam focused through the focusing lens and the cathode sheet.

The laser may be a diode pumped solid state laser (DPSS) allowing pulse modulation.

The laser may be a fiber laser.

According to the present invention, it is possible to provide a cathode cutting device having a high yield and operation rate because there is no need to stop a manufacturing line even if cathodes having various shapes are manufactured on a manufacturing line.

Also, it is possible to provide a cathode cutting device that may lower the cost of a cathode cutting process.

BRIEF DESCRIPTION OF THE DRAWINGS

Since the attached drawings illustrate exemplary embodiments of the present invention and play a role in conveying the technical scope of the present invention along with the detailed description, the present invention should not be construed as being limited to matters depicted in the drawings.

DETAILED DESCRIPTION OF THE INVENTION

Figure 1:
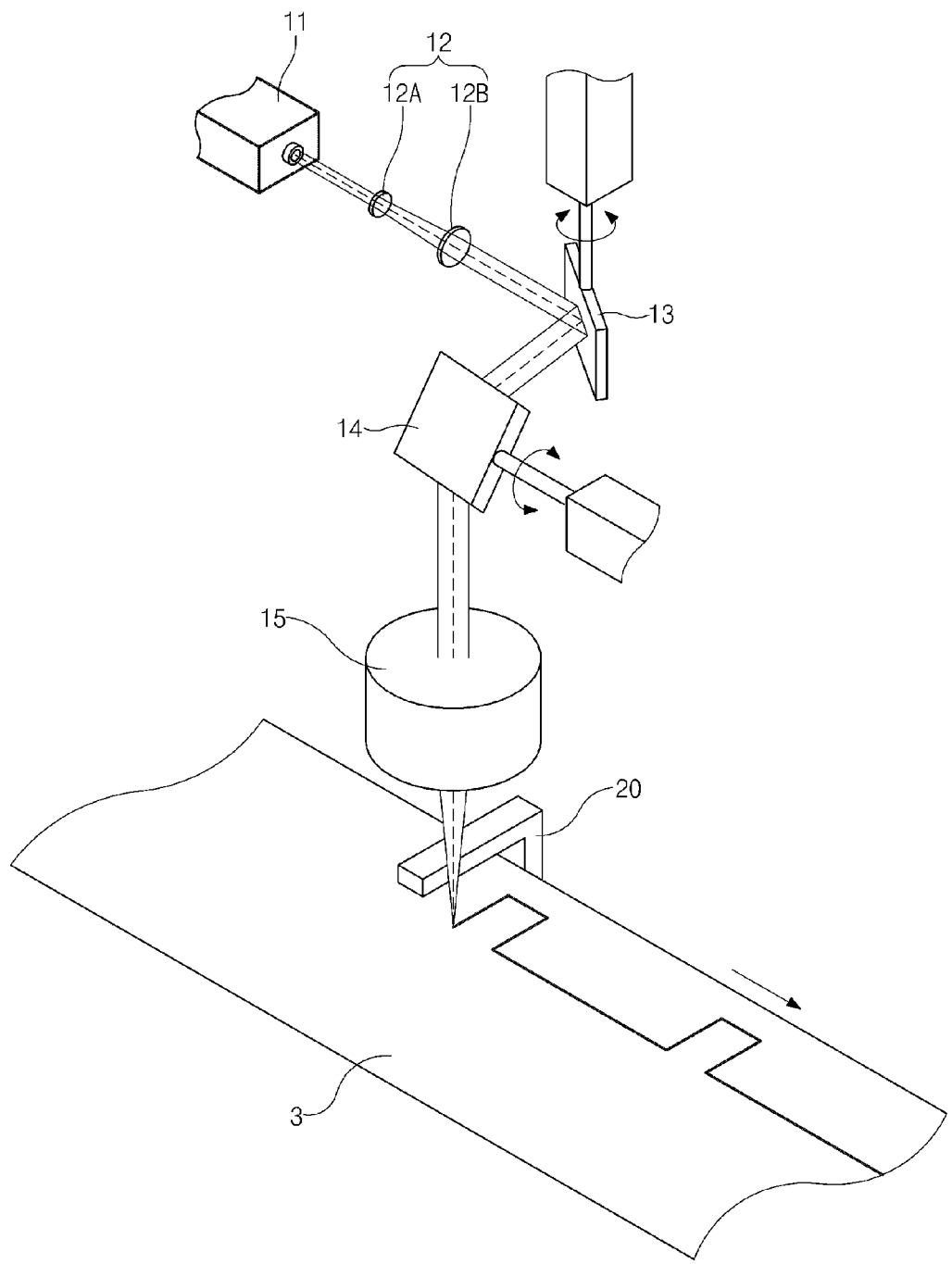
FIG. 1 is a perspective view of a portion of a cathode cutting device using a laser according to the present invention.

In the following, an exemplary embodiment of the present invention is described in detail. However, the present invention is not limited or defined by the following embodiment.

The terms or words used in the detailed description and claims should not be limitatively construed as typical meanings or meanings indicated in dictionaries but should be construed as meanings and concepts matching the technical spirit of the present invention based on the principle that the inventor may properly define the concepts of terms in order to describe his or her invention in the best mode.

In the drawing, the size of each component or a specific part of the component is exaggerated, omitted or simply shown for the convenience and clarity of description. Thus, the size of each component does not substantially reflect an actual size. When it is determined that a detailed description of a related known function or configuration may unnecessarily obscure the subject of the present invention, such a description is not provided.

FIG. 1 is a perspective view of a portion of a cathode cutting device using a laser according to the present invention.

Referring to FIG. 1, a cathode cutting device using a laser according to an exemplary embodiment of the present invention (hereinafter, referred to as a "cathode cutting device") includes a laser oscillator 11 emitting a laser beam, and a focusing lens 15 focusing the laser beam emitted from the laser oscillator 11 and radiating a focused beam to a cathode sheet 3 in order to cut the cathode sheet 3. A focal spot of a laser beam passing through the focusing lens 15 may be in contact with the surface of the cathode sheet 3. In this example, the focal spot indicates a laser beam in depth of focus to be described below.

A laser used in the present invention may be a laser of a pulse modulation system having a pulse width smaller than or equal to 1 μs in oscillation shape of a laser and a Q-switching or master oscillator pulse amplification (MOPA) system may be used as the pulse modulation system. However, the present invention is not limited thereto and any pulse modulation system having a pulse width of 10 ps to 11 μs may be used.

An optical fiber may be employed as a resonator used for generating a laser from the laser oscillator 11, a laser emitted by using the optical fiber as the resonator is referred to as a fiber laser, and the present invention may use the fiber laser. Also, a diode pumped solid state laser (DPSS) may be used.

Figure 2:
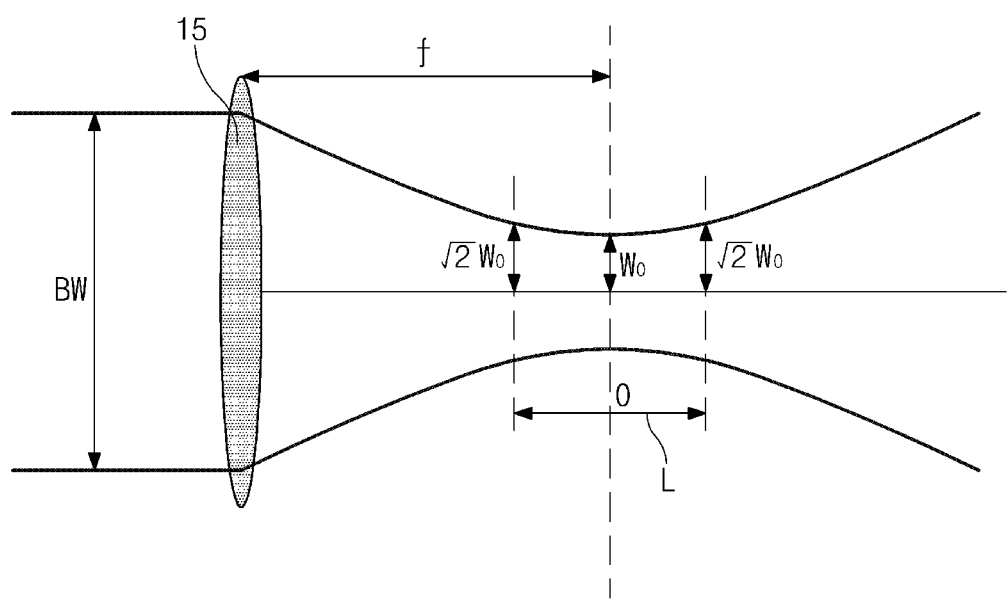
FIG. 2 is a diagram representing an optical path of a laser beam passing through a focusing lens.

FIG. 2 is a diagram representing an optical path of a laser beam passing through a focusing lens.

When light width is BW, the minimum radius of a focused laser spot is $W_0$, and the focal distance of the focusing lens 15 is f, the distance between two points at which the radius of the focused laser spot is $\sqrt{2}W_0$ is depth of focus. Only when a cutting target is located in a focal spot that is a laser beam in the depth of focus, it is possible to cut with sufficient energy, and when the cutting target is out of the focal spot, the cutting target is incompletely cut or cutting quality becomes poor because the energy of the laser beam remarkably decreases.

The size $W_0$ of the focal spot may be represented by Equation ① below:

$$W_0 = \frac{4\lambda M^2 f}{\pi D} \qquad 1$$

In Equation ①, λ, is the wavelength of a laser, $M^2$ is a variable that is a beam mode parameter, represents the quality of the laser and has a theorectial value of 1 and an actual value of about 1.3. $M^2$ of the laser used in the present invention may be close to 1 but depend on the power and oscillation system of the laser. However, when seeing Equation ①, $M^2$ may have a value of 1 to 2.0 because the depth of focus increases in order to decrease the size of the focal spot when $M^2$ is equal to or larger than 2. The parameter f is the focal distance of the focusing lens 15 and D is the light width of a laser beam entering the focusing lens 15.

The depth of focus may be represented by Equation ②, where L represents the depth of focus which is referred to also as a Rayleigh length:

$$L = \frac{8 \cdot f^2 \cdot \lambda}{\pi \cdot D^2} \cdot M^2 \qquad 2$$

From the relationship between Equations ① and ② above, Equation ③ below is derived:

$$L = W_0 \cdot \frac{2f}{D} \qquad 3$$

When the size $W_0$ of the focal spot is small, the energy of the laser beam is concentrated on a narrow region and thus it is easy to cut a cutting target, and when the depth of focus is long, it is possible to easily cut even if the location of the cutting target relative to the laser beam varies or the surface of the cutting target is not even. Ideally, the size $W_0$ of the focal spot may be small and the depth of focus may be long.

However, when seeing Equation ③ above, the depth of focus is proportional to the size of the laser spot.

Thus, when the size of the focal spot is small, the energy density per unit area of the laser beam may be high but the depth of focus also shortens and thus the cutting target is not easily cut when the location of the cutting target relative to the laser beam varies or the surface of the cutting target is not even.

On the contrary, when the depth of focus is long, cutting is less sensitive to what the location of the cutting target relative to the laser beam varies or the surface of the cutting target is not even. Thus, since setting the location of the cutting target or a focus is easy but the size of the focal spot also increases along with the depth of focus, there is a limitation in that the energy density per unit area of the laser beam decreases to a level lower than a level at which it is possible to cut the cutting target.

As such, since it is difficult to make the depth of focus very long and the size of the focal spot very small, maintaining the balance between the depth of focus and the size of the focal spot is very important in cutting the cathode sheet 3. Also, in cutting a cathode by using the laser, it is necessary to check which variable is important.

In the following, a cathode cutting device used for a related experiment and capable of being used actually in a cathode cutting process is first described and next, maintaining the balance between the depth of focus and the size of the laser spot and an experiment for checking which variable is important and its result are described.

Figure 3:
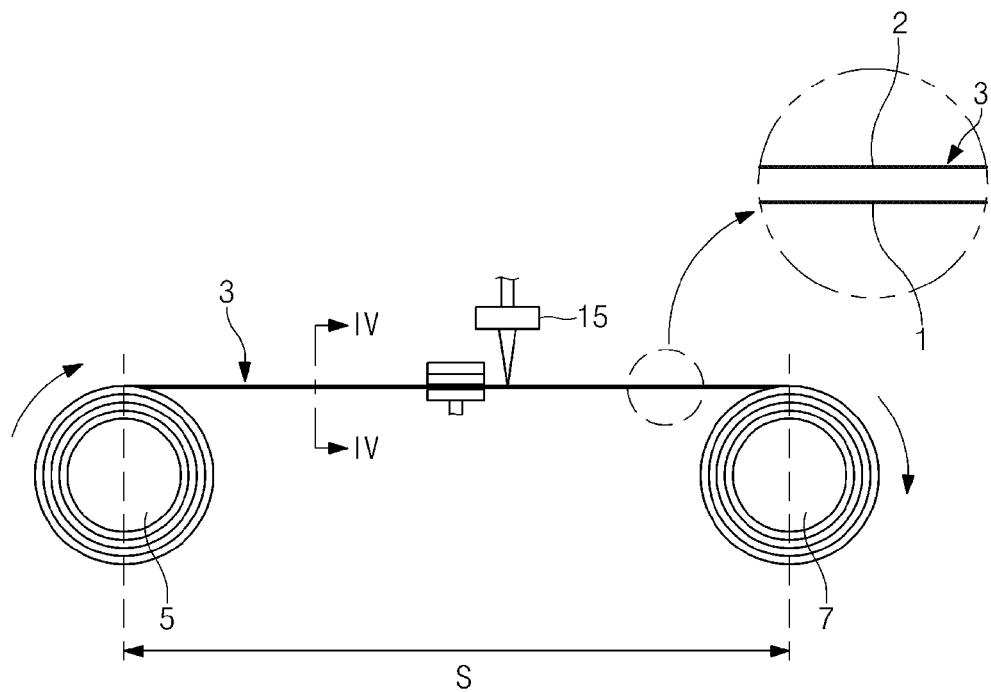
FIG. 3 is a schematic front view of a cathode cutting device using a laser according to the present invention.
Figure 4:
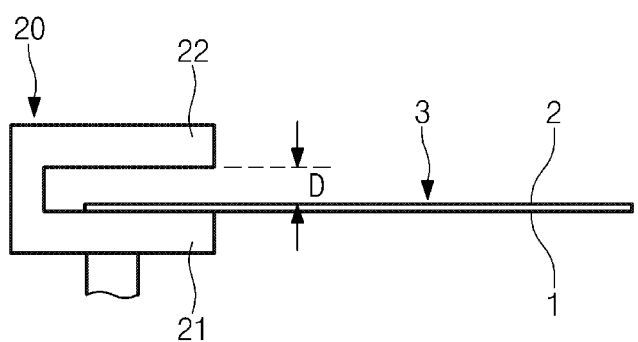
FIG. 4 is a cross-sectional view taken along line IV-IV' in FIG. 3.

FIG. 3 is a schematic front view of a cathode cutting device using a laser according to the present invention, and FIG. 4 is a cross-sectional view taken along line IV-IV' in FIG. 3.

Referring to FIGS. 1, 3 and 4, the cathode cutting device according to the present invention further includes a unwinder 5 unwinding the cathode sheet 3 and a winder 7 disposed at an interval from the un-winder 5 and re-winding the cathode sheet 3 being unwound by the un-winder 5, in addition to the laser oscillator 11 and the focusing lens 15 as described above.

The focusing lens 15 plays a role in radiating a laser beam to a suspension section S of the cathode sheet 3 between the un-winder 5 and the winder 7.

The cathode sheet 3 is wound on the un-winder 5, which unwinds the cathode sheet 3, rotating clockwise in FIG. 3. In addition, the winder 7 re-winds the cathode sheet 3 unwound by the un-winder 5, rotating clockwise in FIG. 3.

A unwound section between the un-winder 5 and the winder 7 is referred to as the suspension section S, and the cathode sheet 3 may be unwound and wound under a certain tension to prevent the cathode sheet 3 corresponding to the suspension section S from becoming rippled or folded while the cathode sheet is unwound or wound.

A first mirror 13 and a second mirror 14 may be disposed on an optical path connecting to the laser oscillator 11 and the focusing lens 15.

The first mirror 13 and the second mirror 14 play a role in moving the focal spot of the laser beam focused by the focusing lens 15 to a desired location on the surface of the cathode sheet 3. The first mirror 13 may be rotatable about a first axis and the second mirror 14 be rotatable about a second axis, in which case the first axis and the second axis makes an orthogonal coordinate system and it is possible to move the focal spot of a laser beam to focus to numerous points on the surface of the cathode sheet 3 by adjusting a rotation angle of the first mirror 13 relative to the first axis and a rotation angle of the second mirror 14 relative to the second axis.

Also, a light width adjuster 12 may be disposed on the optical path, in which case the light width adjuster 12 is located closer the first mirror 13 to the laser oscillator 11 and the second mirror 14 and plays a role in adjusting the light width of the laser beam emitted from the laser oscillator 11.

The light width adjuster 12 may include a first lens 12A and a second lens 12B that is located farther than the first lens 12A from the laser oscillator 11, and have a structure (not shown) adjusting the distance between the first lens 12A and the second lens 12B.

It is possible to adjust the distance between the first lens 12A and the second lens 12B by moving at least one of the first lens 12A and the second lens 12B, and accordingly, it is possible to adjust the width of light entering the first mirror 13 and the distance between the focal spot of the laser beam focused through the focusing lens 15 and the cathode sheet 3. A related description is provided in more detail with reference to FIG. 5.

Figure 5:
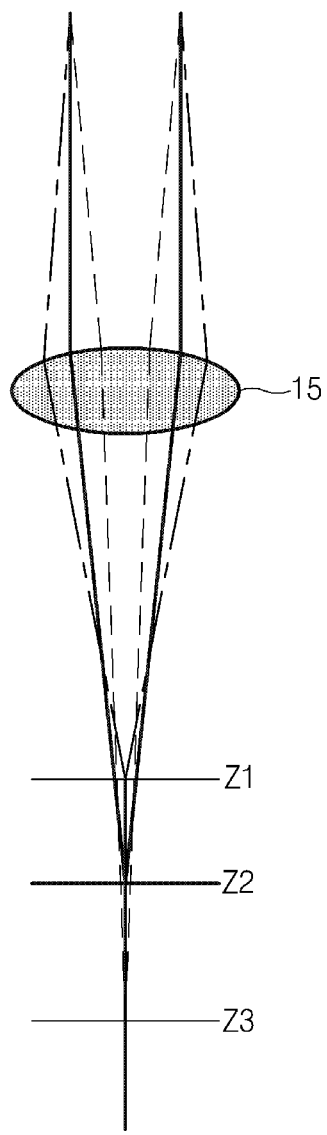
FIG. 5 is a diagram representing the location change of a focal spot of a focused laser beam according to a change in light width.
Figure 6:
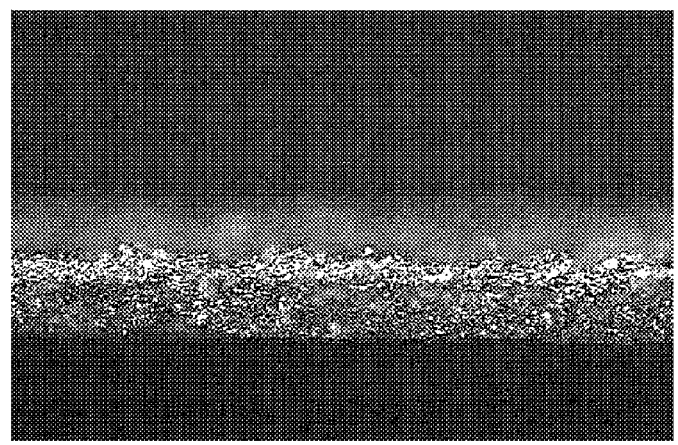
FIGS. 6 to 9 are pictures representing the sectional state of a cathode sheet according to a frequency change of a laser beam.
Figure 7:
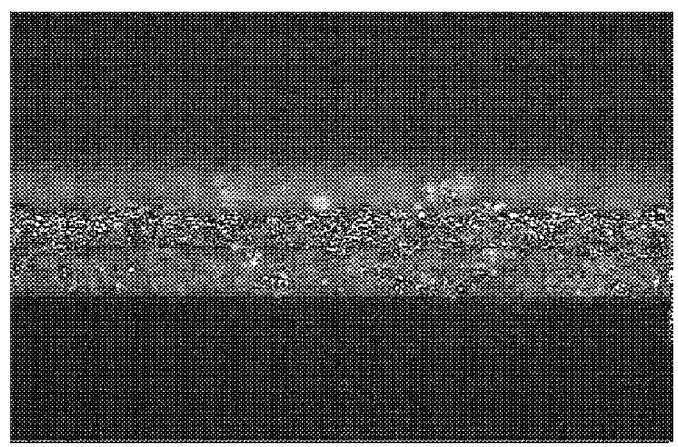
Figure 8:
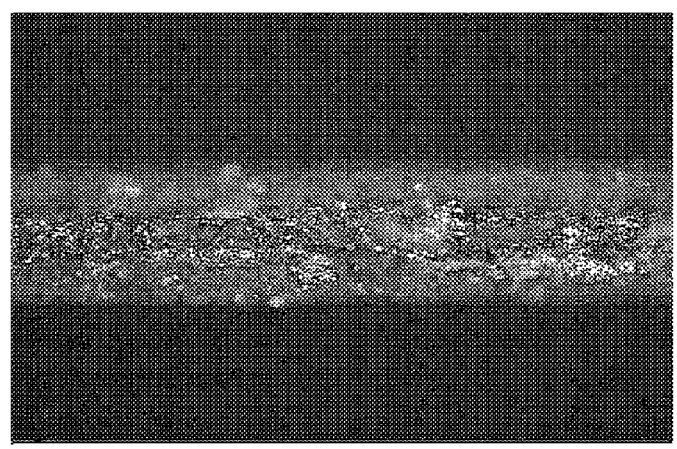
Figure 9:
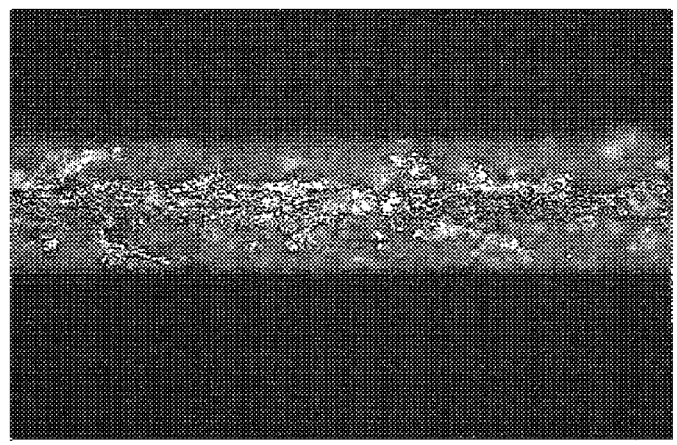

FIG. 5 is a diagram representing the location change of the focal spot of a focused laser beam according to a change in width of light. The laser beam passing through the light width adjuster 12 may enter parallel to the focusing lens 15 (represented by a solid line), in a divergence state (represented by a dashed and dotted line) or in a convergence state (represented by a dotted line), and each laser beam is focused on the locations Z2, Z2, and Z3 in turn. Only three examples are described but it is possible to very finely adjust the distance between the focal spot of the focused laser beam and the cathode sheet 3 by finely adjusting a degree of divergence or convergence of the laser beam.

Since the focal spot needs to be located on the surface of the cathode sheet 3 in order to cut the cathode sheet as desired, accurately matching the focal spot with the surface of the cathode spot 3 is necessarily needed, and to this end, the present invention uses a method of adjusting the gap between the first lens 12A and the second lens 12B.

In order to adjust the height of the focal spot of the laser beam, an actuator having adjustable height is typically used, and if an actuator device is used, it is easy for an installation location to finely vary or go wrong by an external shock. Thus, the present invention uses a method of adjusting the height of the focal spot by adjusting the mutual distance between optical lenses, and this method has an advantage in that it is less affected by the external shock than the actuator device and is not affected by a micro error due to a gap generated when the actuator device is adjusted.

On the other hand, even if the focal spot is finely adjusted through the light width adjuster 12, there is a possibility that the cathode sheet 3 is not easily cut when the height of the cathode sheet 3 corresponding to the suspension section S is not constantly maintained.

The cathode cutting device according to the present invention may further include a sheet guide to minimize a possibility that the cathode sheet 3 may be incompletely cut.

The sheet guide 20 is described in detail with reference to FIGS. 1, 3 and 4.

The sheet guide 20 is a component for supporting at least a portion of the suspension section S in order to inhibit, a region of the suspension section S of the cathode sheet 3 to which a focused laser is radiated, from sagging. The sheet guide 20 includes a first guide 21 supporting a first surface 1 being a sagging surface of both surfaces of the cathode sheet 3 corresponding to the suspension section S, and may further include a second guide 22 which is disposed over a second surface 2 at an interval from the second surface 2 of the suspension section S in order to inhibit the suspension section S of the cathode sheet 3 from rolling in the opposite direction to the first surface 1.

The sheet guide 20 including the first guide 21 and the second guide 22 may be formed in the shape of the letter U as shown in FIGS. 1 and 4 and although FIGS. 1 and 4 show that the sheet guide guides approximately half the width of the cathode sheet 3, it is also possible to install the sheet guide to guide the full width of the cathode sheet 3.

As described above, since it is difficult to make the depth of focus very long and the size of the focal spot of the laser beam very small, maintaining the balance between the depth of focus and the size of the focal spot in cutting the cathode sheet 3 is very important and there is a need to know which variable is important. An experiment for finding it is described below.

In the experiment, the laser oscillator 11, the first mirror 13, the second mirror 14, and the focusing lens 15 that have been described above are used. The thickness of the cathode sheet 3 is about 140 μm, a 20 W laser oscillator 11 is used to generate a laser, a generated laser is a single mode fiber laser having $M^2$ of about 1.3, and a wavelength is about 1070 nm. Also, the diameter of a laser beam entering the focusing lens 15 is about 10 mm.

<Experiment 1>

Firstly, <Table 1> represents a result of cutting a cathode while changing each experiment condition, when the focal length of the focusing lens 15 is about 254 mm and the spot size of the laser beam is about 45 μm.

TABLE 1

| Frequency (kHz) | Cutting Speed of Cathode (mm/s) | Active Material Uncoated Portion (Cut ○, Uncut X) | Active Material Coated Portion (Cut ○, Uncut X) | Energy Density of Focal Spot (J/cm$^2$) |
|---|---|---|---|---|
| 35 | 100 | ○ | ○ | 35.9 |
|  | 110 | ○ | ○ |  |
|  | 120 | ○ | ○ |  |
|  | 130 | ○ | X |  |
|  | 140 | ○ | X |  |
|  | 150 | ○ | X |  |
| 50 | 100 | ○ | ○ | 25.2 |
|  | 110 | ○ | ○ |  |
|  | 120 | ○ | ○ |  |
|  | 130 | ○ | ○ |  |
|  | 140 | ○ | X |  |
|  | 150 | ○ | X |  |
| 75 | 100 | X | ○ | 16.8 |
|  | 110 | X | ○ |  |
|  | 120 | X | ○ |  |
|  | 130 | X | ○ |  |
|  | 140 | X | ○ |  |
|  | 150 | X | ○ |  |

Referring to <Table 1> above, when the frequency of the laser beam is about 35 kHz and the energy density of the focal spot is about 35.9 J/cm$^2$ and when the frequency of the laser beam is about 50 kHz and the energy density of the focal spot is about 25.2 J/cm$^2$, it was possible to cut a cathode active material uncoated portion, and when the cutting speed of a cathode is not only about 100 mm/s but also about 150 mm/s, it was possible to cut an active material uncoated portion.

However, when the frequency of the laser beam increases to about 75 kHz, the energy density of the focal spot becomes about 16.8 J/cm$^2$, in which case it was very difficult to cut the active material uncoated portion even if the coating speed of the cathode is relatively slow, e.g., 100 mm/s. It was assumed as a frequency problem or the energy density problem of the focal spot, in which case the active material uncoated portion was not cut however the frequency increases while the energy density of the focal spot is maintained at about 16.8 J/cm$^2$. On the contrary, when the energy density of the focal spot gradually increases to become about 25 J/cm$^2$ while the frequency is maintained at about 75 kHz, the active material uncoated portion was cut.

As a result, it was found that there is no problem in cutting, as desired, the cathode sheet 3 for manufacturing a cathode plate configuring an electrode assembly used typically for a secondary battery when the energy density of the focal spot of the laser beam radiated to the surface of the cathode sheet 3 becomes about 25 J/cm$^2$, and in comparison, the frequency of the laser beam has no effect on the cutting of the cathode sheet 3.

<Experiment 2>

Next, <Table 2> below represents a result of cutting a cathode while changing each experiment condition, when the focal length of the focusing lens 15 is about 163 mm and the spot size of the laser beam is about 29 μm.

TABLE 2

| Frequency (kHz) | Cutting Speed of Cathode (mm/s) | Active Material Uncoated Portion (Cut ○, Uncut X) | Active Material Coated Portion (Cut ○, Uncut X) | Energy Density of Focal Spot (J/cm$^2$) |
|---|---|---|---|---|
| 35 | 100 | ○ | ○ | 86.5 |
|  | 140 | ○ | ○ |  |
|  | 180 | ○ | ○ |  |
|  | 220 | ○ | ○ |  |
|  | 260 | ○ | X |  |
| 50 | 100 | ○ | ○ | 60.6 |
|  | 140 | ○ | ○ |  |
|  | 180 | ○ | ○ |  |
|  | 220 | ○ | ○ |  |
|  | 260 | ○ | X |  |
| 75 | 100 | ○ | ○ | 40.4 |
|  | 140 | ○ | ○ |  |
|  | 180 | ○ | ○ |  |
|  | 220 | ○ | ○ |  |
|  | 260 | ○ | X |  |

Referring to <Table 2> above, when the frequency of the laser beam is about 35 kHz, about 50 kHz, and about 75 kHz and when the energy density of the focal spot is about 86.5 J/cm$^2$, 60.6 J/cm$^2$, and 40.4 J/cm$^2$, it was possible to cut both the active material coated portion and active material uncoated portion of the cathode sheet 3 when the cutting speed of the cathode is not only about 100 mm/s but also about 220 mm/s. However, when the cutting speed of the cathode is about 260 mm/s, the active material uncoated portion was not cut but it is possible to achieve a yield of the cathode plate enough to come to the market even if the cutting speed of the cathode does not approach about 260 mm/s.

It is possible to conclude that the energy density of the focal spot in Experiment 2 is higher than about 25.2 J/cm$^2$ and the cutting of the cathode sheet 3 is easily implemented in such an energy density state, when compared to Experiment 1.

Also, the frequency in both Experiments 1 and 2 changed to 35 kHz, 50 kHz, and 75 kHz, in which case it was found that the frequency of the laser beam has an adverse affect on the cutting of the cathode sheet 3 when the energy density of the focal spot is higher than about 25.2 J/cm$^2$.

The spot sizes of the laser beams in Experiments 1 and 2 above are 45 μm and 29 μm respectively, in which case when the size of the focal spot varies under frequency, cutting speed and energy density at which both the active material coated portion and the active material uncoated portion are easily cut, the cutting speed of the cathode remarkably decreased or the cutting was incompletely performed when the size of the focal spot of the laser beam radiated to the surface of the cathode sheet 3 is smaller than or equal to about 10 μm or equal to or larger than 50 μm.

As a result, Experiments 1 and 2 and an additional experiment drew a conclusion that it is possible to cut the cathode sheet 3 to provide a yield suitable for coming to the market when the size of the focal spot of the laser beam radiated to the surface of the cathode sheet 3 is about 10 μm to about 50 μm and the energy density of the focal spot is equal to or higher than about 25 J/cm$^2$.

Foil forming the cathode sheet 3 and an active material coated on the foil may be maintained in independent layers even after the cathode sheet 3 is cut, the reason for which is because the quality of the cathode goes down when the laser beam melts the foil and the active material with excessively strong energy so that the foil and the active material are mixed and thus the interface between the foil and the active material becomes unclear.

FIGS. 3 to 9 are pictures representing the cross-sectional state of the cathode sheet according to a change in frequency of the laser beam, and in FIGS. 6 to 9, when the frequency of the laser beam is about 70 kHz, the interface between a central foil and the active material coated on both sides of the foil is very clear, and even when the frequency is about 150 kHz or about 300 kHz, it is less easy to identify the interface between the foil and the active material in comparison to 70 kHz. Also, when the frequency is about 35 kHz, about 50 kHz, and about 75 kHz (which have been used in Experiments 1 and 2), the interface between the foil and the active material was very clear like when the frequency is about 70 kHz.

However, when the frequency is about 50 kHz, it was very difficult to identify the interface between the foil and the active material, and as a result, only when the frequency is adjusted to be within a range of about 35 kHz to about 300 kHz, it was possible to manufacture a cathode plate suitable for coming to the market.

In Experiments 1 and 2, the focal length of the focusing lens 15 is, for example, about 254 mm and about 163 mm, and when the focal length of the focusing lens 15 is within a range of about 100 mm to about 300 mm including the figures, it was possible to adjust the size of the focal spot of the laser beam to be within about 10 μm to about 50 μm. Also, the power of the laser oscillator 11 was 20 W in the experiments, in which case it was possible to find that the cutting quality of the cathode sheet 3 goes down so that it may be difficult to identify the interface between the foil and the active material forming the cathode sheet 3 when the power is over about 500 W.

Thus, the power of the laser oscillator 11 may be about 20 W to about 500 W.

On the other hand, even if the above conditions are all satisfied, the cutting quality of the cathode sheet 3 may go down when the cathode sheet 3 vertically rolls in FIG. 1 while it is unwound and wound by the un-winder 5 and the winder 7.

In order to prevent such a situation, the first guide 21 and the second guide 22 are needed and it was possible to find that the cathode is stably cut when the gap between the first guide 21 and the second guide 22 is about 0.5 mm to about 2 mm.

According to the cathode cutting device according to the present invention as described so far, by determining process conditions optimized for cutting the cathode sheet 3, it is possible to produce the cathode appropriately maintaining the balance between quality and yield, and since the cathode sheet 3 is cut by using the laser in stead of a mold cutter, there is an advantage in that it is possible to increase an operation rate because there is no need to stop a manufacturing line even if various cathodes are manufactured on a manufacturing line. Accordingly, it is possible to lower the cost of a cathode coating process.

The detailed description of the present invention as described above has provided particular embodiments. However, many variations may be implemented without departing from the scope of the present invention. The technical spirit of the present invention should not be defined to be limited to the embodiments of the present invention and should be defined by the following claims and equivalent thereto.

The invention claimed is:

1. A cathode cutting device using a laser comprising:
   a laser oscillator emitting a laser beam;
   a focusing lens focusing the laser beam emitted from the laser oscillator and radiating a focused laser beam to a cathode sheet to cut the cathode sheet;
   an un-winder unwinding the cathode sheet and a winder disposed at an interval from the un-winder and re-winding the cathode sheet being unwound from the un-winder;
   first and second mirrors disposed on an optical path connecting to the laser oscillator and the focusing lens; and
   a light width adjuster disposed on the optical path,
   wherein the focusing lens radiates the laser beam to a suspension section of the cathode sheet between the un-winder and the winder,
   wherein the first and second mirrors are rotatable about first and second axes forming an orthogonal coordinate system to allow a focal spot of a laser beam focused by the focusing lens to move to a desired location on a surface of the cathode sheet,
   wherein the light width adjuster is located closer than the first and second mirrors to the laser oscillator to adjust a light width of the laser beam emitted from the laser oscillator,
   wherein the light width adjuster comprises a first lens and a second lens located farther than the first lens from the laser oscillator, and the light width adjuster has a distance adjustment structure between the first lens and the second lens to adjust a mutual distance between a focal spot of a laser beam focused through the focusing lens and the cathode sheet, and
   wherein the a size of a focal spot of the laser beam radiated to a surface of the cathode sheet is about 10 μm to about 50 μm, and energy density of the focal spot is equal to or higher than about 25 J/cm$^2$.

2. The cathode cutting device of claim 1, wherein a frequency of the laser beam is about 35 kHz to about 300 kHz.

3. The cathode cutting device of claim 1, wherein power of the laser beam is about 20 W to about 500 W.

4. The cathode cutting device of claim 1, wherein the laser has a beam mode parameter $M^2$ of 1 to 2.0, the beam mode parameter being a variable representing quality of the laser.

5. The cathode cutting device of claim 1, wherein a focal length of the focusing lens is about 100 mm to about 300 mm.

6. The cathode cutting device of claim 1, further comprising a sheet guide supporting at least a portion of the suspension section to inhibit, a region of the suspension section of the cathode sheet to which a focused laser is radiated, from sagging.

7. The cathode cutting device of claim 6, wherein the sheet guide comprises a first guide supporting a first surface being a sagging surface of both surfaces of the suspension section of the cathode sheet, and a second guide disposed over a second surface at an interval from the second surface of the suspension section to inhibit the suspension section of the cathode sheet from rolling in the opposite direction to the sagging surface of both surfaces of the suspension section of the cathode sheet.

8. The cathode cutting device of claim 7, wherein a gap between the first guide and the second guide is about 0.5 mm to about 2 mm.

9. The cathode cutting device of claim 1, wherein the laser is a diode pumped solid state laser (DPSS) allowing pulse modulation.

10. The cathode cutting device of claim 1, wherein the laser is a fiber laser.

* * * * *